US012725078B2

(12) United States Patent
Sharma et al.

(10) Patent No.: US 12,725,078 B2
(45) Date of Patent: Sep. 1, 2026

(54) FEATURE SELECTION FOR MACHINE LEARNING MODELS

(71) Applicant: Capital One Services, LLC, McLean, VA (US)

(72) Inventors: Ashwin Assysh Sharma, Vienna, VA (US); Gunther Havel, Portsmouth, NH (US)

(73) Assignee: Capital One Services, LLC, McLean, VA (US)

( * ) Notice: Subject to any disclaimer, the term of this patent is extended or adjusted under 35 U.S.C. 154(b) by 711 days.

(21) Appl. No.: 18/182,050

(22) Filed: Mar. 10, 2023

(65) Prior Publication Data

US 2024/0303537 A1 Sep. 12, 2024

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

PUBLICATIONS

Khan et al., Data Dimension Reduction makes ML Algorithms efficient, arXiv:2211.09392v1 [cs.CV] Nov. 17, 2022; Total pp. 7 (Year: 2022).*

Jovic et al., A review of feature selection methods with applications, MIPRO 2015, May 25-29, 2015, Opatija, Croatia; Total pp. 6 (Year: 2015).*

* cited by examiner

*Primary Examiner* — Alan Chen
(74) *Attorney, Agent, or Firm* — Foley & Lardner LLP

(57) ABSTRACT

Methods and systems are described herein for facilitating segmentation of training data using measures of statistical dispersion (e.g., Gini impurities) of dataset features. The system determines, from a training dataset, a target feature and candidate features. The system determines, for the target feature in relation to each candidate feature, first Gini impurities. The system selects a first and second feature having the lowest first Gini impurities. The system determines, for the target feature in relation to a first combination of the first and second features, a second Gini impurity. If the second Gini impurity does not satisfy a threshold, the system selects a third feature having the next lowest first Gini impurity and determines a third Gini impurity for a second combination of the first, second, and third features. If the third Gini impurity satisfies the threshold, the system trains a model using the target, first, second, and third features.

20 Claims, 7 Drawing Sheets

200

| Server (201) | Breached? (203) | Bytes Written (206) | Files Deleted (209) | Files Accessed (212) | Number of Access Denied Warnings (215) |
|---|---|---|---|---|---|
| 1 | 0 | 2 | 34 | 785 | 57 |
| 2 | 1 | 4.8 | 485 | 7523 | 860 |
| 3 | 1 | 1.9 | 771 | 4537 | 580 |
| 4 | 1 | 7.6 | 465 | 7869 | 780 |
| 5 | 0 | 10.2 | 94 | 332 | 22 |

| 1 | 0 | 2 | 34 | 785 | 57 |
|---|---|---|---|---|---|
| 5 | 0 | 10.2 | 94 | 332 | 22 |
| 6 | 0 | 5.5 | 58 | 400 | 92 |

303

| 2 | 1 | 4.8 | 485 | 7523 | 860 |
|---|---|---|---|---|---|
| 3 | 1 | 1.9 | 771 | 4537 | 580 |
| 4 | 1 | 7.5 | 465 | 7869 | 780 |
| 7 | 1 | 4 | 596 | 6377 | 220 |

FEATURE SELECTION FOR MACHINE LEARNING MODELS

BACKGROUND

Building machine learning models that provide accurate predictions often requires extensive amounts of training data. As a result, training data can be cumbersome to manage and difficult to process, requiring large amounts of resources. Some actions may be taken to reduce the amount of data needed to build machine learning models. For example, it may be beneficial to reduce the dimensionality of the data (e.g., to remove some features that may result in little to no accuracy loss). Dimensionality reduction may then enable building of less complex machine learning models that perform faster and with little to no accuracy loss. However, it is difficult to reduce dimensionality without understanding how features are related to each other and how those relations affect overall model accuracy and fit. Furthermore, a reduction in dimensionality may be appropriate for certain inputs but inappropriate for other inputs. In some examples, different reductions may be needed for different types of inputs. Thus, a mechanism is desired for reducing the dimensionality of the training data to enable the training of machine learning models using fewer features that most accurately generate predictions.

SUMMARY

Solutions to the above and other problems are described in the current disclosure. In some embodiments, systems and methods are disclosed for generating less complex machine learning models by facilitating the segmentation of training data using measures of statistical dispersion. A data segmentation system may be used to perform the operations described herein. The data segmentation system may determine, among a training dataset, a feature that represents a real-world observation based on other features of the training dataset. For example, the training dataset may include a number of features relating to the breach of a server, and a particular feature may indicate whether each server was breached. The data segmentation system may therefore identify the feature indicating whether each server was breached as the outcome (sometimes referred to as observation or ground truth) and may designate that feature as the target feature. In some embodiments, other features within the training dataset are candidate features. The data segmentation system may determine a measure of statistical dispersion, such as a Gini impurity value, for each candidate feature in relation to the target feature. The Gini impurity values may indicate which candidate features most closely predict the values in the target feature, or the outcome. For example, a feature indicating a number of files accessed on a server in combination with a feature indicating a number of "access denied" warnings may yield the lowest Gini impurity value, indicating that this particular combination of features most accurately predicts whether a server was breached. The data segmentation system may select the candidate feature or combination of candidate features based on the Gini impurity values in relation to the target feature. That is, the selected candidate feature or combination of candidate features may most closely predict the values in the target feature. The data segmentation system may train a machine learning model using the target feature and the selected candidate feature or combination of candidate features, instead of using all candidate features to train the model. Thus, the data segmentation system may reduce the dimensionality of the training data while mostly or fully retaining the accuracy of the trained machine learning model. The accuracy metrics may be calculated using residuals.

In particular, the data segmentation system may determine the target feature and the candidate features of a dataset. For example, from a plurality of features in a training dataset, the data segmentation system may determine a target feature and a plurality of candidate features. The target feature may be a feature associated with an outcome (e.g., with a real-world observation or result) or a feature that functions as a label for training a supervised machine learning model. For example, the target feature may indicate whether a server was breached. The candidate features may be other features within the training dataset. The candidate features may be used to predict the target feature. For example, candidate features may include a number of bytes written, a number of deleted files, a number of accessed files, a number of "access denied" warnings, and/or other suitable features.

The data segmentation system may then determine how well each candidate feature predicts the target feature. For example, the data segmentation system may determine, for the target feature in relation to each feature of the plurality of candidate features, a first plurality of measures of statistical dispersion. The measures of statistical dispersion may be Gini impurity values, mean squared error (MSE), geometric mean squared error (GMSE), or other measures of statistical dispersion. The Gini impurity values may indicate which candidate features best predict the target feature when the target feature is a categorical feature. MSE and GMSE may indicate average squared differences between values of candidate features and values of the target feature when the target feature is a numerical feature. The data segmentation system may select a first feature and a second feature having lower first measures of statistical dispersion than other features in the plurality of candidate features. The first and second features may be the two features having the lowest Gini impurity values in relation to the target feature out of the candidate features. For example, a feature indicating a number of files accessed on a server may have the lowest Gini impurity value in relation to the target feature (e.g., whether the server was breached) out of the candidate features and a feature indicating a number of "access denied" warnings on the server may have the second lowest Gini impurity value in relation to the target feature.

The data segmentation system may then determine how well a first combination of the first and second features predicts the target feature. In particular, the data segmentation system may determine, for the target feature in relation to a first combination of the first feature and the second feature, a second measure of statistical dispersion. The second measure of statistical dispersion may be a new Gini impurity value that is calculated for the target feature in relation to the first combination of the first feature and the second feature. The second measure of statistical dispersion measures how well the first combination of the first and second features predicts values within the target feature. In some embodiments, the data segmentation system may measure the second measure of statistical dispersion for the target feature (e.g., whether a server was breached) in relation to a combination of the feature indicating a number of files accessed on the server and the feature indicating a number of "access denied" warnings.

The data segmentation system may determine whether the first combination predicts the target feature sufficiently well. For example, the data segmentation system may determine whether the second measure of statistical dispersion satisfies a threshold. A measure of statistical dispersion satisfying the threshold may indicate that a given feature or combination of features predicts the values in the target feature sufficiently well. The threshold may be zero or the threshold may be some other value. If the second measure of statistical dispersion satisfies the threshold, the data segmentation system, in response, may generate a machine learning model and train the model using the target feature and the first and second features (i.e., the first combination). For example, the data segmentation system may train the machine learning model using the feature indicating whether a server was breached (indicating the observation to be predicted), the feature indicating a number of files accessed on the server, and the feature indicating a number of "access denied" warnings.

In response to determining that the second measure of statistical dispersion does not satisfy the threshold, the data segmentation system may select an additional feature in order to improve the predictive accuracy of the combination of features. For example, the data segmentation system may select a third feature of the plurality of candidate features having a lower measure of statistical dispersion, in relation to the target feature, than the other features after the first feature and the second feature. For example, the third feature may have the third lowest Gini impurity value in relation to the target feature. The third feature may, for example, be a feature that indicates a number of files deleted from a server. The Gini impurity value of the third feature, as it relates to the feature indicating whether the server was breached, may be the third lowest Gini impurity value.

The data segmentation system may then determine how well the new combination, with the additional feature, predicts or models the target feature. In particular, the data segmentation system may determine, for the target feature as it is related to a second combination of the first feature, the second feature, and the third feature, a third measure of statistical dispersion. The third measure of statistical dispersion may be a new Gini impurity value that is calculated for the target feature in relation to the second combination of the first, second, and third features. The third measure of statistical dispersion may measure how closely the second combination of the first, second, and third features predicts or models the target feature. For example, the data segmentation system may measure the third measure of statistical dispersion for the target feature (e.g., whether a server was breached) in relation to the combination of the feature indicating a number of files accessed on the server, the feature indicating a number of "access denied" warnings, and the feature indicating a number of files deleted from the server.

In response to determining that the third measure of statistical dispersion satisfies the threshold, the data segmentation system may train a model using those three features. That is, the data segmentation system may generate the machine learning model and may train the model using the target feature and the first, second, and third features (i.e., the second combination). For example, the data segmentation system may train the machine learning model using the feature indicating whether a server was breached (indicating the observation), the feature indicating a number of files accessed on the server, the feature indicating a number of "access denied" warnings, and the feature indicating a number of files deleted from the server.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 2 illustrates a portion of a dataset that includes a plurality of entries and a plurality of features, in accordance with one or more embodiments of this disclosure.

FIG. 3 illustrates possible groupings based on a target feature, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
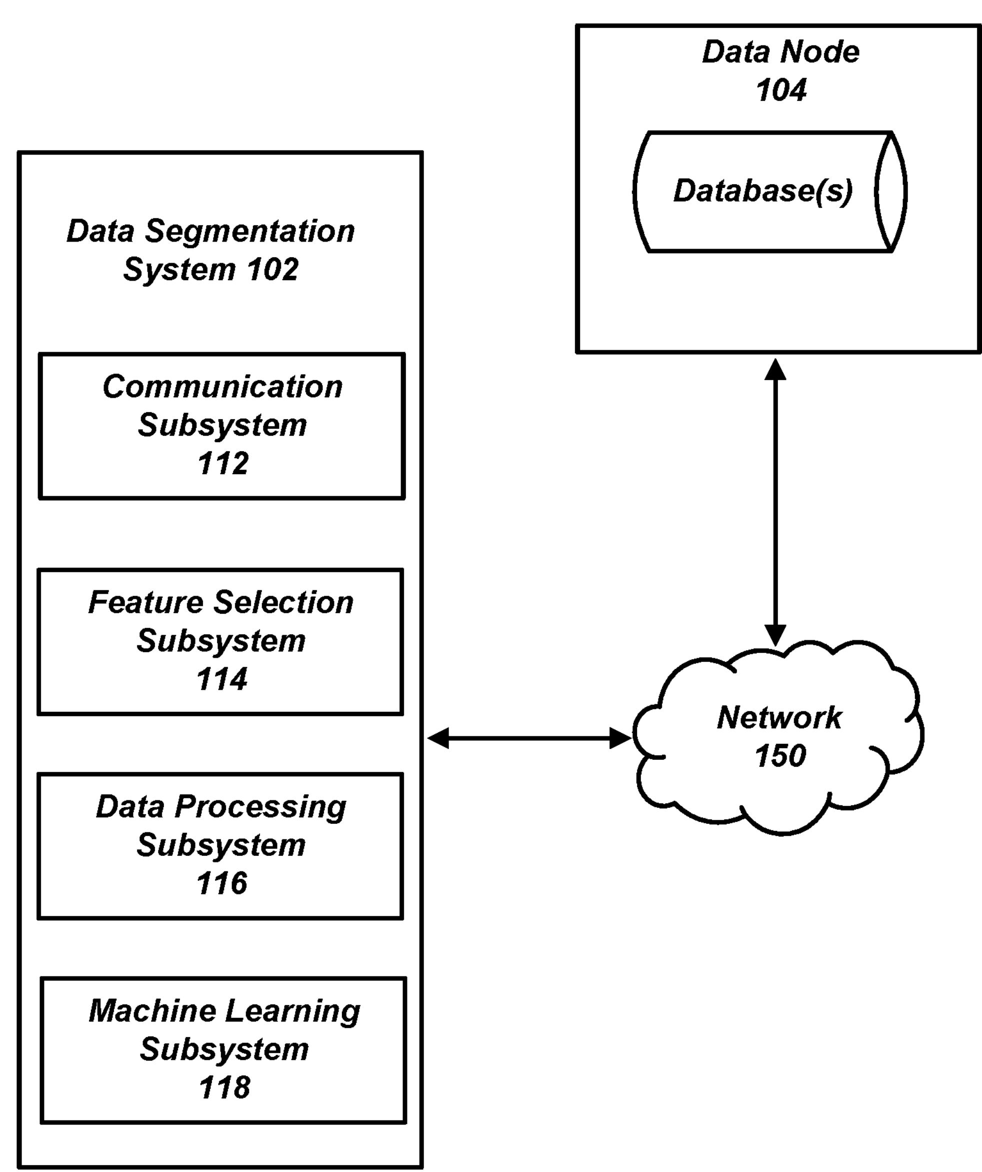
FIG. 1 shows an illustrative system for generating less complex machine learning models by facilitating segmentation of training data using measures of statistical dispersion, in accordance with one or more embodiments of this disclosure.

FIG. 1 shows environment 100, which includes a system for generating less complex machine learning models by facilitating segmentation of training data using measures of statistical dispersion, in accordance with one or more embodiments of this disclosure. Environment 100 includes data segmentation system 102 and data node 104. It should be noted that although data segmentation system 102 and data node 104 are shown as different elements, both of these elements may be housed/configured on the same server, virtual server, or on another suitable system. Data segmentation system 102 may execute instructions for facilitating data segmentation processes. Data segmentation system 102 may include software, hardware, or a combination of the two. For example, data segmentation system 102 may be a physical server or a virtual server that is running on a physical computer system.

Data node 104 may store various datasets (e.g., within one or more databases). In some embodiments, data node 104 may be a database system (e.g., Microsoft SQL® Server). Data node 104 may include software, hardware, or a combination of the two. For example, data node 104 may be a physical server, or a virtual server that is running on a physical computer system. Network 150 may be a local area network, a wide area network (e.g., the Internet), or a combination of the two.

Data segmentation system 102 may access a training dataset comprising a plurality of entries and a plurality of features. For example, data segmentation system 102 may access a database system and/or particular datasets (e.g., stored at data node 104). Data segmentation system 102 may retrieve one or more datasets using communication subsystem 112. In some embodiments, data segmentation system 102 may retrieve the one or more datasets from data node 104 using communication subsystem 112. Communication subsystem 112 may receive the dataset (e.g., via network 150). Communication subsystem 112 may include software components, hardware components, or a combination of both. For example, communication subsystem 112 may include a network card (e.g., a wireless network card and/or a wired network card) that is coupled with software to drive the card. Each dataset may include features and entries which, in some embodiments, may be organized into columns (features) and rows (entries). In some embodiments, entries may be servers and features may be factors relating to whether each server was breached. Communication subsystem 112 may pass the one or more datasets or a pointer (e.g., in memory) to the one or more datasets, to feature selection subsystem 114.

FIG. 2 illustrates a portion of a dataset 200 that includes a plurality of entries and a plurality of features, in accordance with one or more embodiments of this disclosure. In some embodiments, dataset 200 may be a subset of a larger data structure including more entries or more features. Dataset 200 may include entries 201, which indicate a number of servers. Dataset 200 may also include a number of features, such as feature 203 indicating whether each server was breached, feature 206 indicating how many bytes were written on each server, feature 209 indicating how many files were deleted on each server, feature 212 indicating how many files were accessed on each server, and feature 215 indicating a number of "access denied" warnings output by each server.

Data segmentation system 102 (e.g., using feature selection subsystem 114) may determine, from a plurality of features in a dataset (e.g., a dataset from the one or more received/accessed datasets), a target feature and a plurality of candidate features. Feature selection subsystem 114 may include software components, hardware components, or a combination of both. For example, feature selection subsystem 114 may use memory and one or more processors and may be programmed with software code to perform its operations. In some embodiments, feature selection subsystem 114 may perform a statistical dispersion analysis for the whole dataset. Feature selection subsystem 114 may select each feature in turn (or in parallel if enough processors or threads are available) as the target feature for performing statistical dispersion. The other features of the dataset may be selected as candidate features. Thus, feature selection subsystem 114 may iterate through each feature of the dataset to determine which feature is the target feature. In some embodiments, the target feature may be a feature for which measures of statistical dispersion in relation to the candidate features are lowest. In some embodiments, the target feature may be a feature associated with an outcome, a feature for which predictions are to be generated, a feature that serves as a label for training a supervised machine learning model, or some other feature. For example, a target feature may indicate whether a server was breached (e.g., feature 203, as shown in FIG. 2). The candidate features may be used to predict the target feature (e.g., whether the server was breached). For example, candidate features may include a number of bytes written, a number of deleted files, a number of accessed files, a number of "access denied" warnings, or other features (e.g., features 206, 209, 212, and 215, as shown in FIG. 2).

In some embodiments, to determine the target feature within the dataset, feature selection subsystem 114 may access the training dataset including the plurality of features and determine which feature of the plurality of features is a ground truth for the training dataset. The ground truth is the reality being modelled with a given supervised machine learning algorithm. Ground truth is the target for training or validating the model with a labeled dataset. The ground truth may be provided by observation. Feature selection subsystem 114 may then assign the ground truth as the target feature.

In some embodiments, each feature may be categorical or numerical. Categorical features may include data that is separated into categories (e.g., yes or no, 0 or 1, etc.). For example, a feature indicating server breach is categorical (e.g., breached or not breached). In contrast, numerical features may include data that is continuous (e.g., a number or amount). In some embodiments, binning enables data segmentation system 102 to convert numerical features into categorical features by grouping values of those features into discrete groupings.

In some embodiments, data segmentation system 102 may utilize quantile binning. Quantile binning may involve assigning the same number of feature values to each bin if the number of values of a particular feature is evenly divisible by the number of bins. As a result, each bin includes the same number of values, provided that there are no tied values at the boundaries of the bins. In some embodiments, quantile binning may assign values to bins based on percentile ranks.

In some embodiments, data segmentation system 102 may utilize equal depth binning. Equal depth binning may involve dividing data into bins with approximately the same values. For example, a feature indicating a number of accessed files is numerical (e.g., 785 files, 4537 files, etc.). In some embodiments, data segmentation system 102 may bin one or more numerical features. The binning may be determined by a hyperparameter that specifies a number of bins to be used. The hyperparameter may be received (e.g., via communication subsystem 112), predetermined, or otherwise specified. As an example, data segmentation system 102 may bin feature 212, as shown in FIG. 2 (e.g., number of accessed files), which is a numerical feature. The hyperparameter may specify that two bins are to be used. In this case, a first bin may include entries in a lower half (or approximate half) of the entries (e.g., server 5 with 332 files accessed and server 1 with 785 files accessed) and a second bin may include entries in an upper half (or approximate half) of the entries (e.g., server 3 with 4537 files accessed, server 2 with 7523 files accessed, and server 4 with 7869 files accessed). In another example, the hyperparameter may specify that four bins are to be used. In this case, a first bin may include entries in a lower quarter (or approximate quarter) of the entries, a second bin may include entries in the next quarter (or approximate quarter) of entries, and so on.

In some embodiments, data segmentation system 102 may utilize equal width binning. Equal width binning may divide values of a continuous feature into several categories having bins or ranges of the same width. As an example, data segmentation system 102 may bin feature 212, as shown in FIG. 2 (e.g., number of accessed files), which is a numerical feature. Data segmentation system 102 may determine a range of values of feature 212 (e.g., a minimum value of 332 and a maximum value of 7869). Data segmentation system 102 may divide the difference between the maximum and the minimum values of feature 212 (e.g., the range of values of feature 212) by a certain number of bins to be used (e.g., received via communication subsystem 112, predetermined, or otherwise specified). Data segmentation system 102 may then divide the data amongst the bins. In some embodiments, other methods of binning may be used.

In some embodiments, data processing subsystem 116 may determine a certain measure of statistical dispersion (e.g., Gini impurity values, mean squared error (MSE), geometric mean squared error (GMSE), or other measures of statistical dispersion) associated with each segmentation of a dataset based on whether the target feature is categorical or numerical.

In some embodiments, the measure of statistical dispersion may be a Gini impurity value. For example, the measure of statistical dispersion may be a Gini impurity value if the target feature is categorical (e.g., breached or not breached). A Gini impurity value is a number between zero and 0.5 which indicates the likelihood of new data being misclassified if it were given a random label according to the distribution in the dataset. If a given Gini impurity value is zero, it means that the target feature is correlated to the corresponding candidate feature. That is, every value in the target column would have a specific mapping to a value in the candidate column. If a given Gini impurity value is not zero, there is no direct correlation between the target feature and the corresponding candidate feature. The highest possible Gini impurity value (0.5) means that the node is perfectly impure, i.e., the dataset contains an equal number of both values of the target feature for the corresponding candidate feature.

To calculate the Gini impurity value, data processing subsystem 116 may generate a first set of groupings based on a first candidate feature. Each grouping in the first set of groupings may include a corresponding set of entries having a matching feature. FIG. 3 illustrates possible groupings 300 based on a target feature, in accordance with one or more embodiments of this disclosure. For example, FIG. 3 illustrates possible groupings 300 of entries based on the target feature (e.g., feature 203, as shown in FIG. 2) having a value of zero or one. Grouping 301 shows entries having a value of zero in the target feature (e.g., no breach). Grouping 303 shows entries having a value of one in the target feature (e.g., breach). For each grouping, data processing subsystem 116 may calculate a Gini impurity value for each candidate feature as it is related to the target feature. For example, if the target feature indicates breach (e.g., feature 203), data processing subsystem 116 may retrieve grouping 301 and grouping 303. Data processing subsystem 116 may calculate the Gini impurity value for each grouping using the equation below:

$$G = \sum_{i=1}^{C} p(i) * (1 - p(i))$$

Where G is the Gini impurity value for a particular group, C is the number of classes and p(i) is the probability of randomly picking an element of class i. Accordingly, based on the groups in FIG. 3, a Gini impurity value for grouping 301 may be 0.44 while the Gini impurity value for grouping 303 may be 0.5. To calculate the Gini impurity value for the breach feature, data processing subsystem 116 may calculate a weighted average of each value. For the groups in FIG. 3, the calculation of the average would yield a 0.47 Gini impurity value. Thus, the breach feature would have a Gini impurity value of 0.47. Data processing subsystem 116 may repeat this process to calculate the Gini impurity values for other features in the dataset (e.g., every candidate feature of the dataset). For example, data processing subsystem 116 may calculate a Gini impurity value for the target feature (e.g., feature 203) in relation to each of feature 206, feature 209, feature 212, and feature 215.

In some embodiments, the measure of statistical dispersion may be MSE or GMSE. For example, the measure of statistical dispersion may be MSE or GMSE if the target feature is numerical (e.g., a number of accessed files). MSE may measure average squared differences between values of candidate features and values of the target feature. GMSE may measure other average values, such as average squared differences over time. If the values of a candidate feature were to directly correlate to the values of the target feature, the MSE or GMSE may be zero. For example, every value in the target column may have a specific mapping to a value in the candidate column. As the correlation between the target feature and the corresponding candidate feature decreases, MSE or GMSE may increase.

In some embodiments, data processing subsystem 116 may determine the measure of statistical dispersion associated with each segmentation of a dataset. For example, communication subsystem 112 may receive a test dataset that includes a plurality of test entries and the plurality of features. Data processing subsystem 116 may divide the test dataset into subsets according to values of the candidate features. The subsets may include a first plurality of subsets of the test dataset divided according to first values of the first feature. For example, in relation to FIG. 2, the first feature may be a number of accessed files (e.g., feature 212), and the test dataset may be divided into a first group of servers having a number of accessed files greater than or equal to 4,000 and a second group of servers having a number of accessed files under 4,000. The subsets may additionally include a second plurality of subsets of the test dataset divided according to the second values of the first combination of the first feature and the second feature. For example, the first feature may be a number of accessed files (e.g., feature 212) and the second feature may be a number of "access denied" warnings (e.g., feature 215). The test dataset may be divided into a first group of servers having a number of accessed files greater than or equal to 4,000 and a number of "access denied" warnings greater than or equal to 500, a second group of servers having a number of accessed files greater than or equal to 4,000 and a number of "access denied" warnings less than 500, a third group of servers having a number of accessed files less than 4,000 and a number of "access denied" warnings greater than or equal to 500, and so on. The subsets may additionally include a third plurality of subsets of the test dataset divided according to third values of the second combination of the first feature, the second feature, the third feature, and so on.

Data processing subsystem 116 may generate for display a graph comprising a plurality of areas. A first plurality of areas may correspond to the first plurality of subsets of the test dataset divided according to the first values of the first feature. A second plurality of areas may correspond to the second plurality of subsets of the test dataset divided according to the second values of the first combination of the first feature and the second feature. A third plurality of areas corresponds to the third plurality of subsets of the test dataset divided according to the third values of the second combination of the first feature, the second feature, the third feature, and so on. Each area of the plurality of areas may be represented by a color that is based on a corresponding measure of statistical dispersion (e.g., Gini impurity value, MSE, or GMSE) for the target feature in relation to a corresponding value of corresponding features for a corresponding plurality of subsets of the test dataset.

Figure 4:
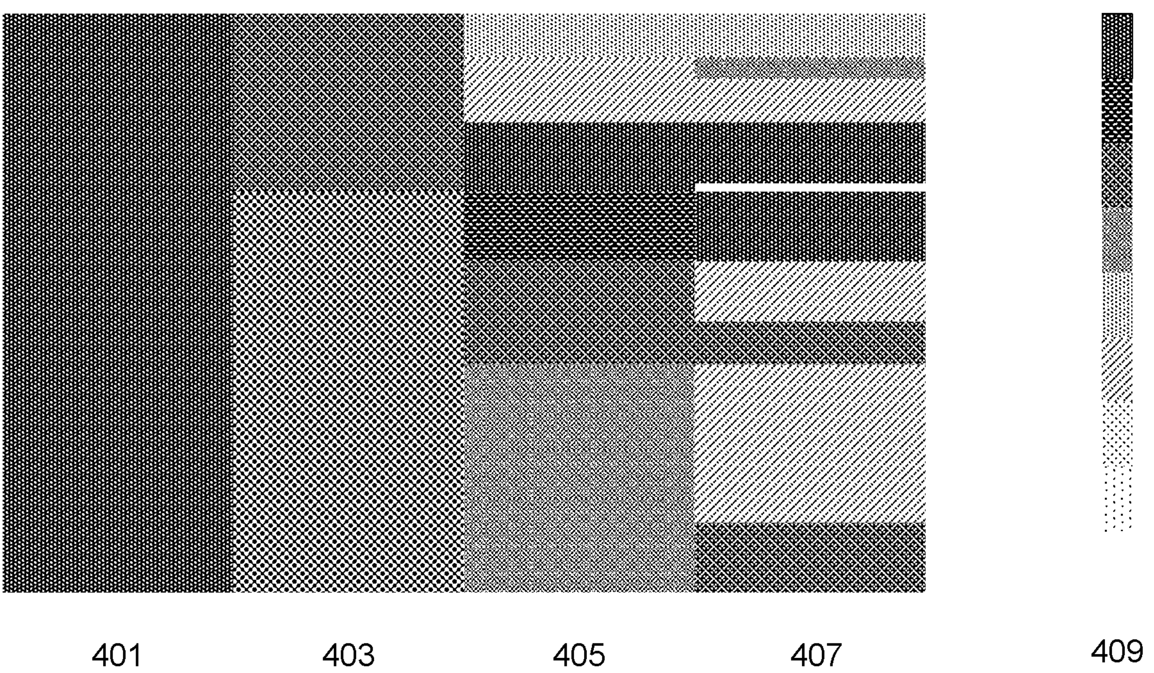
FIG. 4 illustrates a graph showing measures of statistical dispersion for segmented data, in accordance with one or more embodiments of this disclosure.

FIG. 4 illustrates a graph 400 showing measures of statistical dispersion for segmented data, in accordance with one or more embodiments of this disclosure. Graph 400 may include a plurality of areas corresponding to subsets of segmented data. Each area of graph 400 may be associated with a shade or color representing a measure of statistical dispersion (e.g., Gini impurity value, MSE, or GMSE) associated with the divided data. Area 401 may be unsegmented data (e.g., a test dataset that has not been divided according to features). Thus, area 401 may have a high Gini impurity value (e.g., 0.45) and, accordingly, be represented by a dark shade to indicate a high measure of statistical dispersion. For example, spectrum 409 may illustrate a range of shades corresponding to Gini impurity values, where darker shades correspond to higher Gini impurity values and lighter shades correspond to lower Gini impurity values.

Areas 403 may illustrate a segmentation of the data according to a first feature. For example, in relation to FIG. 2, the first feature may be a number of accessed files (e.g., feature 212), and the test dataset may be divided into a first group of servers (e.g., the top portion of areas 403) having a number of accessed files greater than or equal to 4,000 and a second group of servers (e.g., the bottom portion of areas 403) having a number of accessed files under 4,000. The Gini impurity value for the first group may be 0.4 and may be represented by a relatively dark color to indicate a high Gini impurity value. The Gini impurity value for the second group may be 0.33 and may be represented by a slightly lighter color to indicate a slightly lower Gini impurity value. Thus, the lower portion of areas 403 (e.g., corresponding to the second group of servers having a number of accessed files under 4,000) may represent the lowest Gini impurity value (e.g., the highest correlation) among area 401 and areas 403.

Areas 405 may illustrate a segmentation of the data according to a first feature and a second feature. For example, the first feature may be a number of accessed files (e.g., feature 212) and the second feature may be a number of "access denied" warnings (e.g., feature 215). Areas 405 may illustrate segmentation of the dataset according to values of feature 212 and feature 215. Lighter shades of areas 405 may represent lower Gini impurity values associated with the corresponding segmentation of the data. Areas 407 may illustrate a segmentation of the data according to a first feature, a second feature, and a third feature. For example, the first feature may be a number of accessed files (e.g., feature 212), the second feature may be a number of "access denied" warnings (e.g., feature 215), and the third feature may be a number of files deleted (e.g., feature 209). Areas 405 may illustrate segmentation of the dataset according to values of feature 212, feature 215, and feature 209. Lighter shades of areas 407 may represent lower Gini impurity values associated with the corresponding segmentation of the data. Across graph 400, the lightest areas correspond to the lowest Gini impurity values and, therefore, the greatest correlation between the features of the corresponding segmentation and the target feature (e.g., "breach" or "no breach"). Accordingly, graph 400 may be used to visually demonstrate segments of the data that best represent the target feature.

Returning to FIG. 1, once the target feature and the candidate features are selected, data segmentation system 102 (e.g., data processing subsystem 116) may determine, for each of the plurality of candidate features, a corresponding first measure of statistical dispersion, based on the target feature for a corresponding set of entries. Data processing subsystem 116 may include software components, hardware components, or a combination of both. For example, data processing subsystem 116 may use memory and one or more processors and may be programmed with software code to perform its operations. Data processing subsystem 116 may compute a Gini impurity value for the target feature as it relates to each candidate feature. Each Gini impurity value indicates a measure of statistical dispersion between the target feature and each feature of the plurality of candidate features. For example, data processing subsystem 116 may determine a first plurality of Gini impurity values including a Gini impurity value for the target feature in relation to each feature of the plurality of features. The first plurality of Gini impurity values therefore includes a Gini impurity value for the target feature (e.g., feature 203) in relation to feature 206, a Gini impurity value for the target feature (e.g., feature 203) in relation to feature 209, a Gini impurity value for the target feature (e.g., feature 203) in relation to feature 212, and a Gini impurity value for the target feature (e.g., feature 203) in relation to feature 215.

Data processing subsystem 116 may select a first feature and a second feature having lower first measure of statistical dispersion (e.g., Gini impurity values, MSE, or GMSE) than other features in the plurality of features. For example, data processing subsystem 116 may select the first and second features that have the two lowest measures of statistical dispersion out of the candidate features in relation to the target feature. In one example, feature 212 and feature 215 may have the two lowest measures of statistical dispersion out of the first plurality of measures of statistical dispersion. Thus, data processing subsystem 116 may select feature 212 and feature 215 as the first and second features. In some embodiments, selecting the first feature and the second feature may involve receiving the first plurality of measures of statistical dispersion from a statistical dispersion algorithm based on a first plurality of dataset inputs. For example, each dataset input may include, for the corresponding plurality of entries, the target feature and a feature of the plurality of candidate features. The statistical dispersion algorithm may determine, for a dataset input, measures of statistical dispersion (e.g., Gini impurity values, MSE, or GMSE) for each candidate feature within a dataset in relation to a target feature. Data processing subsystem 116 may determine a first lowest measure of statistical dispersion and a second lowest measure of statistical dispersion of the first plurality of measures of statistical dispersion (e.g., the two lowest Gini impurity values output by the statistical dispersion algorithm for the dataset input). Data processing subsystem 116 may determine a first feature identifier corresponding to the first lowest measure of statistical dispersion and a second feature identifier corresponding to the second lowest measure of statistical dispersion. Data processing subsystem 116 may then identify the first feature based on the first feature identifier and the second feature based on the second feature identifier.

Data processing subsystem 116 may determine, for the target feature in relation to a first combination of the first feature and the second feature, a second measure of statistical dispersion. The second measure of statistical dispersion measures how closely correlated the target feature (e.g., feature 203) is with the combination of the first and second features (e.g., feature 212 and feature 215). In some embodiments, determining the second measure of statistical dispersion includes extracting, from the training dataset, a first set of values associated with the first feature, a second set of values associated with the second feature, and a third set of values associated with the target feature. Data processing subsystem 116 may generate a new dataset based on the first set of values, the second set of values, and the third set of values. Data processing subsystem 116 may then input the new dataset into a statistical dispersion algorithm (e.g., as described above) to obtain the second measure of statistical dispersion.

Data processing subsystem 116 may compare the second measure of statistical dispersion with a threshold. In some embodiments, the threshold may be zero or some other value less than 0.5, which is the maximum possible measure of statistical dispersion. In some embodiments, the threshold may be based on information gain. Information gain measures a reduction in entropy. For example, data processing subsystem 116 may determine an information gain associated with the first combination and the second combination. Data processing subsystem 116 may then generate the threshold based on the information gain. A lower threshold (i.e., closer to zero) requires that the combination of the first and second features must be more closely correlated with the target feature to satisfy the threshold, whereas a higher threshold (i.e., closer to 0.5) allows the combination of the first and second features to be less closely correlated. In response to determining that the second measure of statistical dispersion satisfies the threshold, machine learning subsystem 118 generates a model using a subset of the plurality of features. For example, machine learning subsystem 118 trains the model using the target feature, the first feature, and the second feature.

Data segmentation system 102 may perform additional steps in response to determining that the second measure of statistical dispersion does not satisfy the threshold. Feature selection subsystem 114 may select a third feature of the plurality of features based on the third feature having a lowest measure of statistical dispersion, in relation to the target feature, after the first feature and the second feature. For example, the third feature may have the third lowest measure of statistical dispersion out of the plurality of values. Data processing subsystem 116 may then determine, for the target feature in relation to a second combination of the first feature, the second feature, and the third feature, a third measure of statistical dispersion. In some embodiments, the data processing subsystem may determine whether the third measure of statistical dispersion satisfies a threshold. In response to determining that the third measure of statistical dispersion satisfies a threshold, data segmentation system 102 (e.g., machine learning subsystem 118) may generate a machine learning model using the plurality of entries and a subset of the plurality of features. For example, machine learning subsystem 118 may train the machine learning model using the target feature, the first feature, the second feature, and the third feature.

In some embodiments, if the third measure of statistical dispersion does not satisfy the threshold, data segmentation system 102 may continue the process until the threshold is satisfied. For example, feature selection subsystem 114 may select an additional feature with the next lowest measure of statistical dispersion and may determine a new measure of statistical dispersion for the combination of features including the additional feature. Data processing subsystem 116 may then compare the new measure of statistical dispersion with the threshold. Data segmentation system 102 repeats this process until the threshold is satisfied. Once the threshold is satisfied, machine learning subsystem 118 trains the machine learning model using the target feature and the combination of candidate features for which the measure of statistical dispersion of the combination satisfies the threshold.

In some embodiments, data segmentation system 102 may continue this process until a different stop condition is met. For example, the stop condition may be when a combination of features has reached a certain number (e.g., 5, 10, 15, etc.) or the stop condition may be when the number of entries in a group reaches a certain number (e.g., 2). That is, in some instances, it may not be useful to calculate statistical dispersion for a group of a single entry. Therefore, in some embodiments, data processing subsystem 116 may determine a number of records in each group and if one or more groups have one record, data processing subsystem 116 may stop processing.

Figure 5:
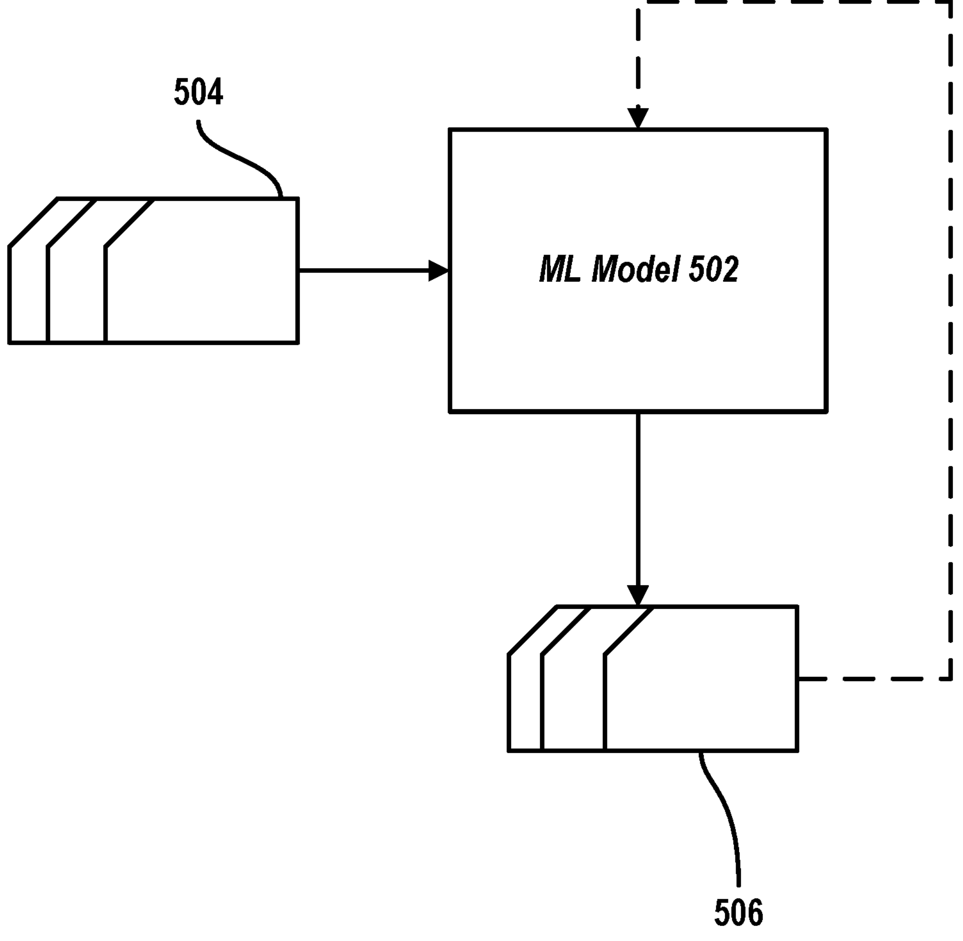
FIG. 5 illustrates an exemplary machine learning model, in accordance with one or more embodiments of this disclosure.

FIG. 5 illustrates an exemplary machine learning model 502, in accordance with one or more embodiments. The machine learning model may have been trained using features associated with entries, where the entries represent servers that may or may not have been breached. The features may include bytes written by each server, files deleted from each server, files accessed on each server, number of "access denied" warnings issued by each server, or other features. The machine learning model may have been trained to predict whether a particular server was breached based on these features. In some embodiments, machine learning model 502 may be included in machine learning subsystem 118 or may be associated with machine learning subsystem 118. Machine learning model 502 may take input 504 (e.g., entries and corresponding features) and may generate output 506 (e.g., predictions of breach). The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

In some embodiments, once the machine learning model is trained, machine learning subsystem 118 may test the accuracy of the machine learning model using test datasets. For example, communication subsystem 112 receives a test dataset of test entries and the plurality of features. Data processing subsystem 116 may divide the test dataset into subsets according to values of the first feature, the second feature, and the third feature (e.g., if the model was trained using the third feature). For example, dividing the test dataset according to these features may include dividing the test dataset according to entries that have each combination of the different values of the features. A first subset may include entries having a first value or a first range of values for each of the three features. A second subset may include entries having a first value or a first range of values for the first feature and second feature and a second value or a second range of values for the third feature. A third subset may include entries having a first value or a first range of values for the first feature and a second value or a second range of values for the second and third features. For example, in reference to FIG. 2, a first subset may include servers for which the number of files deleted is over 400, the number of files accessed is more than 5,000, and the number of "access denied" warnings is over 500 (e.g., server 2 and server 4). A second subset may include servers for which the number of files deleted is over 400, the number of files accessed is more than 5,000, and the number of "access denied" warnings is between 50 and 500 (e.g., server 3), and so on.

Machine learning subsystem 118 may then input the subsets of the test dataset into the model to obtain subsets of predictions. Each subset of predictions is associated with a corresponding subset of the test dataset. For example, the test dataset has been divided into subsets each containing a plurality of entries (e.g., servers). The predictions corresponding to these entries are therefore divided according to the same subsets as the entries.

Data processing subsystem 116 may then determine residual values for the subsets of predictions to determine whether the machine learning model is sufficiently accurate for each subset of predictions. A residual value for each prediction is the difference between the prediction and the observed value for that prediction. For example, a prediction for a particular server may be 0.93, or 93% likely that the server was breached, and the observed value may be 1, or "breached." The residual value for that prediction is 0.07. In some embodiments, the residual values of the subsets of predictions may be stored in data structures corresponding to the subsets of predictions. In some embodiments, data processing subsystem 116 may generate an average residual value across all predictions within each subset of predictions. For example, a first subset of predictions may have an average residual value of 0.02, which is more accurate as compared to a second subset of predictions having an average residual of 0.15.

In some embodiments, data processing subsystem 116 may compare the residual for each subset of predictions to a residual threshold. For example, the residual threshold may be a threshold level of accuracy required for each subset of predictions. In some embodiments, the residual threshold may be predetermined, retrieved from a database (e.g., data node 104), manually determined, or determined in another manner. A higher residual threshold enables the machine learning model to be less accurate for subsets of predictions whereas a lower residual threshold requires that the machine learning model be more accurate for each subset of predictions. Using the above example, a first subset of predictions may have an average residual value of 0.02, whereas a second subset of predictions may have an average residual of 0.15. If the residual threshold is 0.20, neither subset meets the residual threshold (e.g., the model is sufficiently accurate for both subsets). However, if the residual threshold is 0.05, the first subset of predictions does not meet the residual threshold (e.g., the model is sufficiently accurate for the first subset) but the second subset of predictions does meet the residual threshold (e.g., the model is not sufficiently accurate for the second subset).

In response to determining that a residual value corresponding to a subset of predictions meets the residual threshold, data segmentation system 102 may train a new model for that subset of predictions. Data segmentation system 102 may train the new model to be more accurate for that particular subset of predictions. To do so, data segmentation system 102 may repeat the process previously outlined for training a machine learning model but may perform this process only on the particular subset of predictions. In some embodiments, data processing subsystem 116 may determine, for the target feature in relation to each feature of the plurality of candidate features for the subset of predictions, a new first plurality of measures of statistical dispersion (e.g., new first Gini impurity value). Feature selection subsystem 114 may select a new first feature and a new second feature having lower measures of statistical dispersion than a set of other features in the plurality of candidate features for the subset of predictions. Data processing subsystem 116 may determine, for the target feature in relation to a new first combination of the new first feature and the new second feature, a new second measure of statistical dispersion. In response to determining that the new second measure of statistical dispersion satisfies the threshold, machine learning subsystem 118 trains a new model for the subset of predictions using the plurality of test entries and the target feature, the new first feature, and the new second feature.

In some embodiments, data segmentation system 102 may determine whether the accuracy of the model is improved by a sufficient amount to justify training the model with additional features (e.g., the third feature). For example, data processing subsystem 116 may first perform the process with two features. In some embodiments, communication subsystem 112 receives a test dataset of test entries and the plurality of features. Data processing subsystem 116 may divide the test dataset into a first plurality of subsets according to first values of the first feature and the second feature. For example, dividing the test dataset according to these features may include dividing the test dataset according to entries that have each combination of the different values of the features. A first subset may include entries having a first value or a first range of values for both features. A second subset may include entries having a first value or a first range of values for the first feature and a second value or a second range of values for the second feature. A third subset may include entries having a second value or a second range of values for the first feature and a first value or a first range of values for the second feature, and so on. Machine learning subsystem 118 may input the first subsets of the test dataset into the model to obtain first subsets of predictions. Each subset of predictions is associated with a corresponding subset of the test dataset. Data processing subsystem 116 then determines the first residual values for the first subsets of predictions.

Data processing subsystem 116 may then repeat this process with three features. This may include dividing the test dataset into a second plurality of subsets according to the second values of the first feature, the second feature, and the third feature. Machine learning subsystem 118 then inputs the second plurality of subsets of the test dataset into the model to obtain a second plurality of subsets of predictions. Data processing subsystem 116 then determines a second plurality of residual values for the second plurality of subsets of predictions.

Data processing subsystem 116 may then calculate a difference between the first plurality of residual values and the second plurality of residual values. Data processing subsystem 116 may compare the difference with an improvement threshold. For example, the improvement threshold may be a threshold level of improvement required to justify training the model with an additional (e.g., third) feature. In some embodiments, the improvement threshold may be predetermined, retrieved from a database (e.g., data node 104), manually determined, or determined in another manner. A lower improvement threshold enables the machine learning model to include the third feature even if it does not improve the predictions by a large amount whereas a higher improvement threshold requires that the third feature improve the predictions by a higher amount in order to be included in the training. In response to determining that the difference does not satisfy the improvement threshold, machine learning subsystem 118 trains the model using the plurality of test entries, the target feature, the first feature, and the second feature (i.e., excluding the third feature).

In some embodiments, data processing subsystem 116 may determine whether an information gain is improved by a sufficient amount to justify training the model with additional features (e.g., the third feature). For example, in response to determining that the second measure of statistical dispersion does not satisfy the threshold, data processing subsystem 116 determines a first information gain associated with the first combination (e.g., the first and second features) and a second information gain associated with the second combination (e.g., the first, second, and third features). Data processing subsystem 116 then calculates a difference between the first information gain and the second information gain. Data processing subsystem 116 may compare the difference with an improvement threshold. For example, the improvement threshold may be a threshold level of improvement required to justify training the model with an additional (e.g., third) feature. In some embodiments, the improvement threshold may be predetermined, retrieved from a database (e.g., data node 104), manually determined, or determined in another manner. A lower improvement threshold enables the machine learning model to include the third feature even if it does not increase the information gain by a large amount whereas a higher improvement threshold requires that the third feature increase the information gain by a higher amount in order to be included in the training. In response to determining that the difference does not satisfy an improvement threshold, machine learning subsystem 118 generates the model using the corresponding plurality of entries and the target feature, the first feature, and the second feature (i.e., excluding the third feature).

Computing Environment

Figure 6:
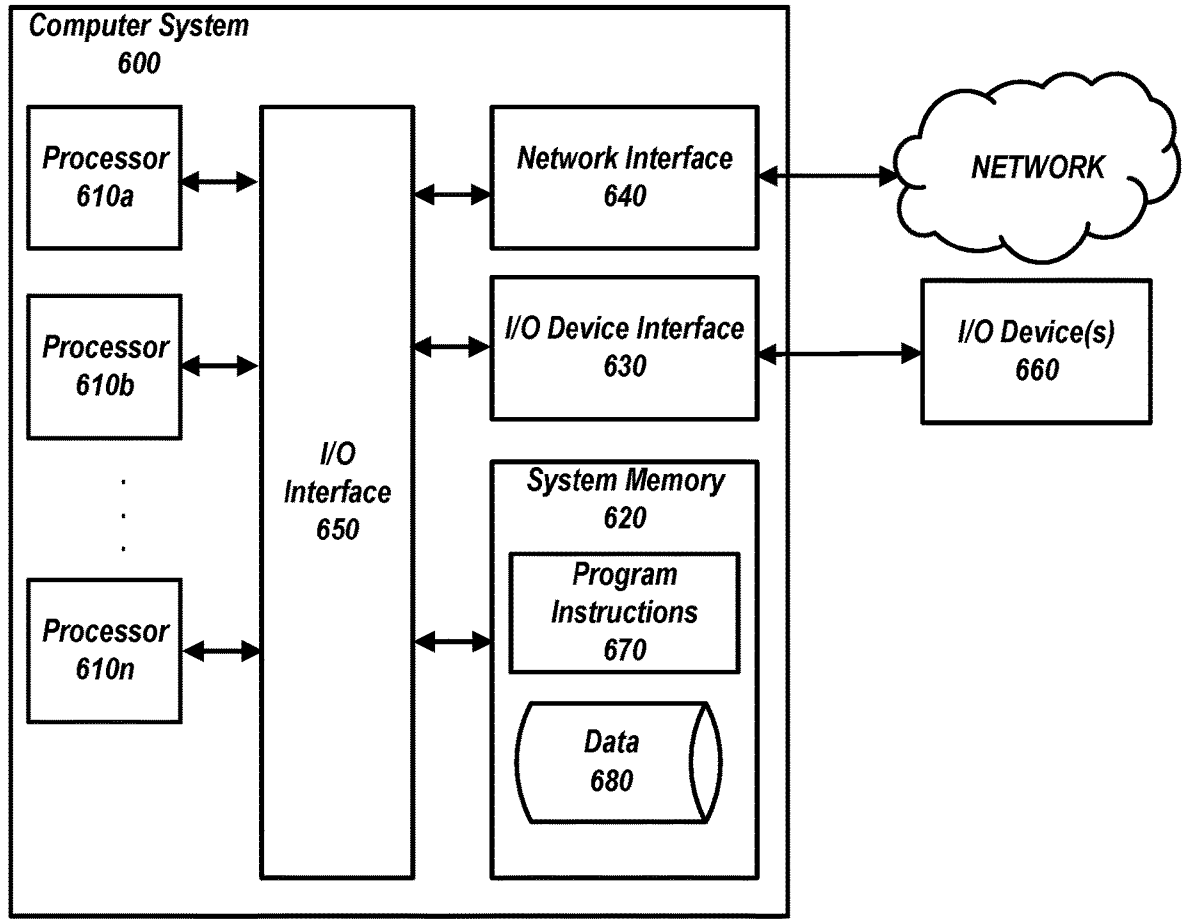
FIG. 6 shows an example computing system that may be used in accordance with one or more embodiments of this disclosure.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
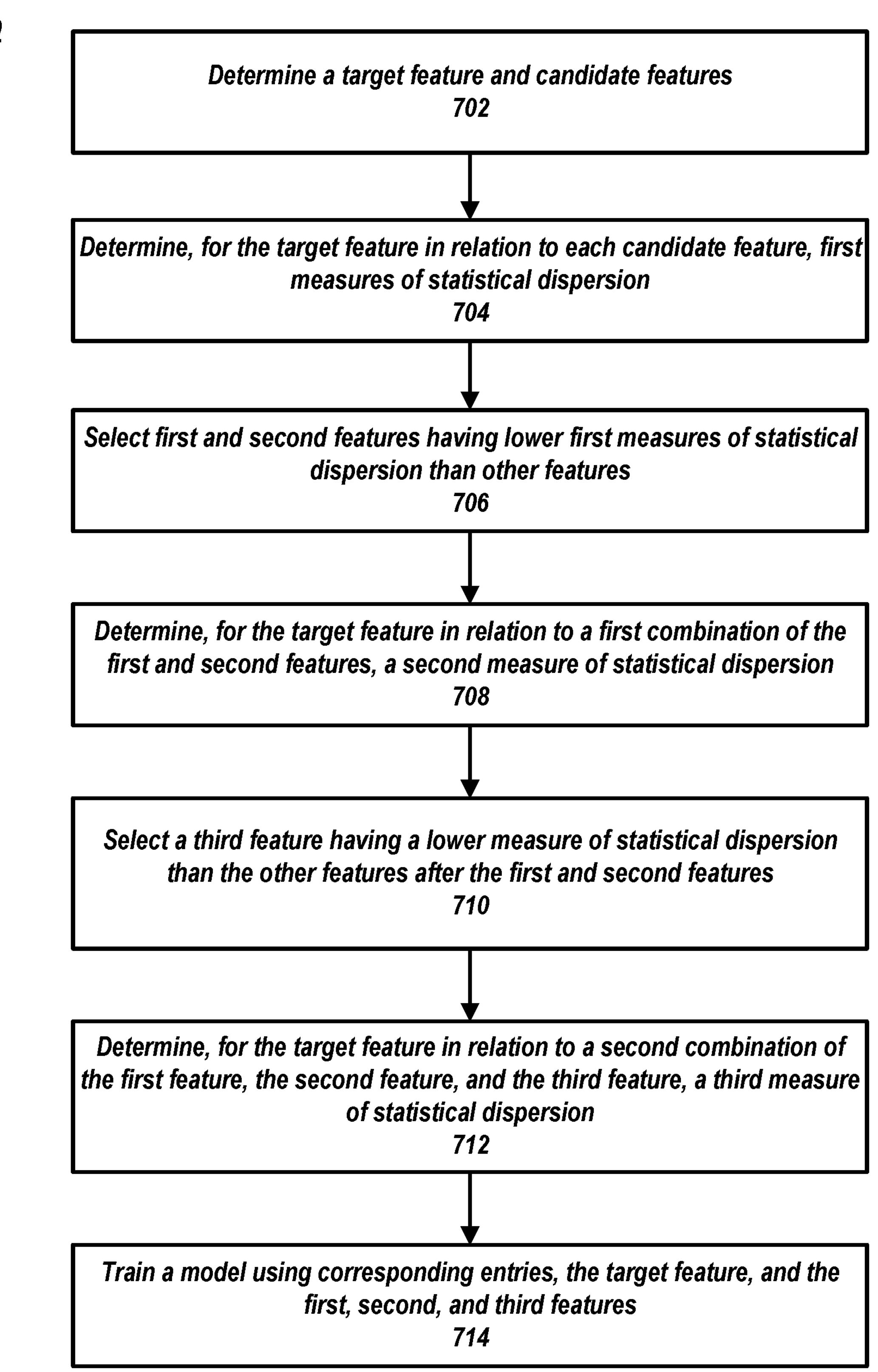
FIG. 7 is a flowchart of operations for facilitating segmentation of training data for machine learning models, in accordance with one or more embodiments of this disclosure.

FIG. 7 shows a flowchart of the process 700 for facilitating segmentation of training data for machine learning models, in accordance with one or more embodiments. For example, the system may use process 700 (e.g., as implemented on one or more system components described above) to determine which features to use for training a machine learning model.

At 702, data segmentation system 102 (e.g., using one or more of processors 610*a*-610*n*) determines a target feature and candidate features. The target feature may be a feature associated with an outcome or a feature that functions as a label for training a supervised machine learning model. The candidate features may be other features within the training dataset. For example, the candidate features may be used to predict the target feature. In some embodiments, data segmentation system 102 may obtain the dataset from system memory 620, via the network, or elsewhere. Data segmentation system 102 may determine the features using one or more of processors 610*a*-610*n*.

At 704, data segmentation system 102 (e.g., using one or more of processors 610*a*-610*n*) determines, for the target feature in relation to each candidate feature, first measures of statistical dispersion. The measures of statistical dispersion may be Gini impurity values, MSE, GMSE, or other measures of statistical dispersion. For example, the particular measure of statistical dispersion may depend on whether the target feature is categorical or numerical. The measures of statistical dispersion may indicate which candidate features most closely resemble the target feature. In some embodiments, data segmentation system 102 may determine the first measures of statistical dispersion using one or more of processors 610*a*-610*n*.

In some embodiments, data segmentation system 102 selects a first feature having a lower first measure of statistical dispersion than other features. The first feature may be the feature having the lowest Gini impurity value, MSE, or GMSE in relation to the target feature out of the candidate features. In some embodiments, in response to a determination that the first measure of statistical dispersion of the first feature in relation to the target feature satisfies a threshold, data segmentation system 102 may train a model using corresponding entries, the target feature, and the first feature. In some embodiments, in response to a determination that the first measure of statistical dispersion of the first feature in relation to the target feature does not satisfy the threshold, data segmentation system 102 may proceed to 706.

At 706, data segmentation system 102 (e.g., using one or more of processors 610*a*-610*n*) selects first and second features having lower first measures of statistical dispersion than other features. The first and second features may be the two features having the lowest Gini impurity values, MSE, or GMSE in relation to the target feature out of the candidate features. In some embodiments, data segmentation system 102 may select the first and second features using one or more of processors 610*a*-610*n*.

At 708, data segmentation system 102 (e.g., using one or more of processors 610*a*-610*n*) determines, for the target feature in relation to a first combination of the first and second features, a second measure of statistical dispersion. The second measure of statistical dispersion may be a new Gini impurity value, MSE, or GMSE that is calculated for the target feature in relation to the first combination of the first feature and the second feature. The second measure of statistical dispersion measures how closely the first combination of the first and second features resembles the target feature. In some embodiments, data segmentation system 102 may determine the second measure of statistical dispersion using one or more of processors 610*a*-610*n*. In some embodiments, in response to a determination that the second measure of statistical dispersion of the first combination in relation to the target feature satisfies the threshold, data segmentation system 102 may train a model using corresponding entries, the target feature, the first feature, and the second feature. In some embodiments, in response to a determination that the second measure of statistical dispersion does not satisfy the threshold, data segmentation system 102 may proceed to 710.

At 710, data segmentation system 102 (e.g., using one or more of processors 610*a*-610*n*) selects a third feature having a lower measure of statistical dispersion than the other features after the first and second features. The third feature may have the third lowest Gini impurity value, MSE, or GMSE in relation to the target feature. In some embodiments, data segmentation system 102 may select the third feature in response to a determination that the second measure of statistical dispersion does not satisfy the threshold. In some embodiments, data segmentation system 102 may selects select the third feature using one or more of processors 610*a*-610*n*.

At 712, data segmentation system 102 (e.g., using one or more of processors 610*a*-610*n*) determines, for the target feature in relation to a second combination of the first feature, the second feature, and the third feature, a third measure of statistical dispersion. The third measure of statistical dispersion may be a new Gini impurity value that is calculated for the target feature in relation to the second combination of the first, second, and third features. The third measure of statistical dispersion measures how closely the second combination of the first, second, and third features resembles the target feature. In some embodiments, data segmentation system 102 may determine the third measure of statistical dispersion using one or more of processors 610*a*-610*n*.

At 714, data segmentation system 102 (e.g., using one or more of processors 610*a*-610*n*) trains a model using corresponding entries, the target feature, and the first, second, and third features. In some embodiments, data segmentation system 102 may train the model using one or more of processors 610*a*-610*n*.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising determining, from a plurality of features in a training dataset, a target feature and a plurality of candidate features, determining, for the target feature in relation to each feature of the plurality of candidate features, a first plurality of measures of statistical dispersion, selecting a first feature and a second feature having lower first measures of statistical dispersion than other features in the plurality of candidate features, determining, for the target feature in relation to a first combination of the first feature and the second feature, a second measure of statistical dispersion, in response to determining that the second measure of statistical dispersion does not satisfy a threshold, selecting a third feature of the plurality of candidate features having a lower measure of statistical dispersion, in relation to the target feature, than the other features after the first feature and the second feature, and determining, for the target feature in relation to a second combination of the first feature, the second feature, and the third feature, a third measure of statistical dispersion; and in response to determining that the third measure of statistical dispersion satisfies the threshold, generating a model using a corresponding plurality of entries and a subset of the plurality of features, wherein the model is trained using the subset of the plurality of features comprising the target feature, the first feature, the second feature, and the third feature.

2. Any of the proceeding embodiments, further comprising, in response to determining that the second measure of statistical dispersion satisfies the threshold, generating the model using a different subset of the plurality of features, wherein the model is trained using the different subset of the plurality of features comprising the target feature, the first feature, and the second feature.

3. Any of the proceeding embodiments, wherein determining the target feature comprises:

accessing the training dataset comprising the plurality of features, determining which feature of the plurality of features is a ground truth for the training dataset, wherein the ground truth is data provided by observation, and assigning the ground truth as the target feature.

4. Any of the proceeding embodiments, wherein determining the first plurality of measures of statistical dispersion comprises calculating a corresponding measure of statistical dispersion for the target feature in relation to each feature of the plurality of candidate features.

5. Any of the proceeding embodiments, further comprising determining an information gain associated with the first combination and the second combination, wherein the information gain measures a reduction in entropy, and generating the threshold based on the information gain.

6. Any of the proceeding embodiments, further comprising receiving a test dataset comprising a plurality of test entries and the plurality of features, dividing the test dataset into a plurality of subsets according to values of the first feature, the second feature, and the third feature, and inputting the plurality of subsets of the test dataset into the model to obtain a plurality of subsets of predictions, wherein each subset of predictions of the plurality of subsets of predictions is associated with a corresponding subset of the test dataset.

7. Any of the proceeding embodiments, further comprising determining a plurality of residual values for the plurality of subsets of predictions, and in response to determining that a residual value corresponding to a subset of predictions meets a residual threshold, determining, for the target feature in relation to each feature of the plurality of candidate features for the subset of predictions, a new first plurality of measures of statistical dispersion, selecting a new first feature and a new second feature having lower measures of statistical dispersion than a set of other features in the plurality of candidate features for the subset of predictions, determining, for the target feature in relation to a new first combination of the new first feature and the new second feature, a new second measure of statistical dispersion, and in response to determining that the new second measure of statistical dispersion satisfies the threshold, training a new model for the subset of predictions using the plurality of test entries and the target feature, the new first feature, and the new second feature.

8. Any of the proceeding embodiments, further comprising receiving a test dataset comprising a plurality of test entries and the plurality of features, dividing the test dataset into a first plurality of subsets according to first values of the first feature and the second feature, inputting the first plurality of subsets of the test dataset into the model to obtain a first plurality of subsets of predictions, wherein each subset of predictions of the first plurality of subsets of predictions is associated with a corresponding subset of the test dataset, determining a first plurality of residual values for the first plurality of subsets of predictions, dividing the test dataset into a second plurality of subsets according to second values of the first feature, the second feature, and the third feature, inputting the second plurality of subsets of the test dataset into the model to obtain a second plurality of subsets of predictions, determining a second plurality of residual values for the second plurality of subsets of predictions, calculating a difference between the first plurality of residual values and the second plurality of residual values, and in response to determining that the difference does not satisfy an improvement threshold, training the model using the plurality of test entries, the target feature, the first feature, and the second feature.

9. Any of the proceeding embodiments, wherein selecting the first feature and the second feature further comprises receiving the first plurality of measures of statistical dispersion from a statistical dispersion algorithm based on a first plurality of dataset inputs, wherein each dataset input comprises, for the corresponding plurality of entries, the target feature and a feature of the plurality of candidate features, determining a first lowest measure of statistical dispersion and a second lowest measure of statistical dispersion of the first plurality of measures of statistical dispersion, determining a first feature identifier corresponding to the first lowest measure of statistical dispersion and a second feature identifier corresponding to the second lowest measure of statistical dispersion, and identifying the first feature based on the first feature identifier and the second feature based on the second feature identifier.

10. Any of the proceeding embodiments, wherein determining the second measure of statistical dispersion further comprises extracting, from the training dataset, a first set of values associated with the first feature, a second set of values associated with the second feature, and a third set of values associated with the target feature, generating a new dataset based on the first set of values, the second set of values, and the third set of values, and inputting the new dataset into a statistical dispersion algorithm to obtain the second measure of statistical dispersion.

11. Any of the proceeding embodiments, further comprising, in response to determining that the second measure of statistical dispersion does not satisfy the threshold, determining a first information gain associated with the first combination and a second information gain associated with the second combination, calculating a difference between the first information gain and the second information gain, and in response to determining that the difference does not satisfy an improvement threshold, generating the model using the corresponding plurality of entries and a different subset of the plurality of features, wherein the model is trained using the different subset of the plurality of features comprising the target feature, the first feature, and the second feature.

12. Any of the proceeding embodiments, further comprising receiving a test dataset comprising a plurality of test entries and the plurality of features, dividing the test dataset into a plurality of subsets according to values of the plurality of candidate features, wherein the plurality of subsets comprises a first plurality of subsets of the test dataset divided according to first values of the first feature, a second plurality of subsets of the test dataset divided according to second values of the first combination of the first feature and the second feature, and a third plurality of subsets of the test dataset divided according to third values of the second combination of the first feature, the second feature, and the third feature, and generating for display a graph comprising a plurality of areas, wherein a first plurality of areas corresponds to the first plurality of subsets of the test dataset divided according to the first values of the first feature, a second plurality of areas corresponds to the second plurality of subsets of the test dataset divided according to the second values of the first combination of the first feature and the second feature, and a third plurality of areas corresponds to the third plurality of subsets of the test dataset divided according to the third values of the second combination of the first feature, the second feature, and the third feature, and wherein each area of the plurality of areas comprises a color that is based on a corresponding measure of statistical dispersion for the target feature in relation to a corresponding value of corresponding features for a corresponding plurality of subsets of the test dataset.

13. A tangible, non-transitory, machine-readable medium storing instructions that, when executed by a data processing apparatus, cause the data processing apparatus to perform operations comprising those of any of embodiments 1-12.

14. A system comprising: one or more processors, and memory storing instructions that, when executed by the processors, cause the processors to effectuate operations comprising those of any of embodiments 1-12.

15. A system comprising means for performing any of embodiments 1-12.

16. A system comprising cloud-based circuitry for performing any of embodiments 1-12.

What is claimed is:

1. A system for facilitating segmentation of training data for machine learning models, the system comprising:

one or more processors; and a non-transitory computer-readable storage medium storing instructions, which when executed by the one or more processors cause the one or more processors to:

access a training dataset comprising a plurality of entries and a plurality of features;

determine a target feature of the plurality of features;

determine, for the target feature in relation to each feature of the plurality of features, a first plurality of Gini impurity values, wherein each value within the first plurality of Gini impurity values indicates a measure of statistical dispersion between the target feature and each feature of the plurality of features;

select a first feature and a second feature of the plurality of features based on the first feature and the second feature having lowest first Gini impurity values of the first plurality of Gini impurity values;

determine, for the target feature in relation to a first combination of the first feature and the second feature, a second Gini impurity value;

in response to determining that the second Gini impurity value does not satisfy a threshold:

select a third feature of the plurality of features based on the third feature having a lowest Gini impurity value, in relation to the target feature, after the first feature and the second feature; and determine, for the target feature in relation to a second combination of the first feature, the second feature, and the third feature, a third Gini impurity value; and in response to determining that the third Gini impurity value satisfies the threshold, generate a machine learning model using the plurality of entries and a subset of the plurality of features, wherein the machine learning model is trained using the subset of the plurality of features comprising the target feature, the first feature, the second feature, and the third feature.

2. A method comprising:

determining, from a plurality of features in a training dataset, a target feature and a plurality of candidate features;

determining, for the target feature in relation to each feature of the plurality of candidate features, a first plurality of measures of statistical dispersion;

selecting a first feature and a second feature having lower first measures of statistical dispersion than other features in the plurality of candidate features;

determining, for the target feature in relation to a first combination of the first feature and the second feature, a second measure of statistical dispersion;

in response to determining that the second measure of statistical dispersion does not satisfy a threshold:

selecting a third feature of the plurality of candidate features having a lower measure of statistical dispersion, in relation to the target feature, than the other features after the first feature and the second feature; and determining, for the target feature in relation to a second combination of the first feature, the second feature, and the third feature, a third measure of statistical dispersion; and in response to determining that the third measure of statistical dispersion satisfies the threshold, generating a model using a corresponding plurality of entries and a subset of the plurality of features, wherein the model is trained using the subset of the plurality of features comprising the target feature, the first feature, the second feature, and the third feature.

3. The method of claim 2, further comprising, in response to determining that the second measure of statistical dispersion satisfies the threshold, generating the model using a different subset of the plurality of features, wherein the model is trained using the different subset of the plurality of features comprising the target feature, the first feature, and the second feature.

4. The method of claim 2, wherein determining the target feature comprises:

accessing the training dataset comprising the plurality of features;

determining which feature of the plurality of features is a ground truth for the training dataset, wherein the ground truth is data provided by observation; and assigning the ground truth as the target feature.

5. The method of claim 2, wherein determining the first plurality of measures of statistical dispersion comprises calculating a corresponding measure of statistical dispersion for the target feature in relation to each feature of the plurality of candidate features.

6. The method of claim 2, further comprising:

determining an information gain associated with the first combination and the second combination, wherein the information gain measures a reduction in entropy; and generating the threshold based on the information gain.

7. The method of claim 2, further comprising:

receiving a test dataset comprising a plurality of test entries and the plurality of features;

dividing the test dataset into a plurality of subsets according to values of the first feature, the second feature, and the third feature; and inputting the plurality of subsets of the test dataset into the model to obtain a plurality of subsets of predictions, wherein each subset of predictions of the plurality of subsets of predictions is associated with a corresponding subset of the test dataset.

8. The method of claim 7, further comprising:

determining a plurality of residual values for the plurality of subsets of predictions; and in response to determining that a residual value corresponding to a subset of predictions meets a residual threshold:

determining, for the target feature in relation to each feature of the plurality of candidate features for the subset of predictions, a new first plurality of measures of statistical dispersion;

selecting a new first feature and a new second feature having lower measures of statistical dispersion than a set of other features in the plurality of candidate features for the subset of predictions;

determining, for the target feature in relation to a new first combination of the new first feature and the new second feature, a new second measure of statistical dispersion; and in response to determining that the new second measure of statistical dispersion satisfies the threshold, training a new model for the subset of predictions using the plurality of test entries and the target feature, the new first feature, and the new second feature.

9. The method of claim 2, further comprising:

receiving a test dataset comprising a plurality of test entries and the plurality of features;

dividing the test dataset into a first plurality of subsets according to first values of the first feature and the second feature;

inputting the first plurality of subsets of the test dataset into the model to obtain a first plurality of subsets of predictions, wherein each subset of predictions of the first plurality of subsets of predictions is associated with a corresponding subset of the test dataset;

determining a first plurality of residual values for the first plurality of subsets of predictions;

dividing the test dataset into a second plurality of subsets according to second values of the first feature, the second feature, and the third feature;

inputting the second plurality of subsets of the test dataset into the model to obtain a second plurality of subsets of predictions;

determining a second plurality of residual values for the second plurality of subsets of predictions;

calculating a difference between the first plurality of residual values and the second plurality of residual values; and in response to determining that the difference does not satisfy an improvement threshold, training the model using the plurality of test entries, the target feature, the first feature, and the second feature.

10. The method of claim 2, wherein selecting the first feature and the second feature further comprises:

receiving the first plurality of measures of statistical dispersion from a statistical dispersion algorithm based on a first plurality of dataset inputs, wherein each dataset input comprises, for the corresponding plurality of entries, the target feature and a feature of the plurality of candidate features;

determining a first lowest measure of statistical dispersion and a second lowest measure of statistical dispersion of the first plurality of measures of statistical dispersion;

determining a first feature identifier corresponding to the first lowest measure of statistical dispersion and a second feature identifier corresponding to the second lowest measure of statistical dispersion; and identifying the first feature based on the first feature identifier and the second feature based on the second feature identifier.

11. The method of claim 2, wherein determining the second measure of statistical dispersion further comprises:

extracting, from the training dataset, a first set of values associated with the first feature, a second set of values associated with the second feature, and a third set of values associated with the target feature;

generating a new dataset based on the first set of values, the second set of values, and the third set of values; and inputting the new dataset into a statistical dispersion algorithm to obtain the second measure of statistical dispersion.

12. The method of claim 2, further comprising, in response to determining that the second measure of statistical dispersion does not satisfy the threshold:

determining a first information gain associated with the first combination and a second information gain associated with the second combination;

calculating a difference between the first information gain and the second information gain; and in response to determining that the difference does not satisfy an improvement threshold, generating the model using the corresponding plurality of entries and a different subset of the plurality of features, wherein the model is trained using the different subset of the plurality of features comprising the target feature, the first feature, and the second feature.

13. The method of claim 2, further comprising:

receiving a test dataset comprising a plurality of test entries and the plurality of features;

dividing the test dataset into a plurality of subsets according to values of the plurality of candidate features, wherein the plurality of subsets comprises a first plurality of subsets of the test dataset divided according to first values of the first feature, a second plurality of subsets of the test dataset divided according to second values of the first combination of the first feature and the second feature, and a third plurality of subsets of the test dataset divided according to third values of the second combination of the first feature, the second feature, and the third feature; and generating for display a graph comprising a plurality of areas, wherein a first plurality of areas corresponds to the first plurality of subsets of the test dataset divided according to the first values of the first feature, a second plurality of areas corresponds to the second plurality of subsets of the test dataset divided according to the second values of the first combination of the first feature and the second feature, and a third plurality of areas corresponds to the third plurality of subsets of the test dataset divided according to the third values of the second combination of the first feature, the second feature, and the third feature, and wherein each area of the plurality of areas comprises a color that is based on a corresponding measure of statistical dispersion for the target feature in relation to a corresponding value of corresponding features for a corresponding plurality of subsets of the test dataset.

14. One or more non-transitory, computer-readable media for segmenting training data for models, storing instructions that, when executed by one or more processors, cause the one or more processors to perform operations comprising:

determining, from a plurality of features in a training dataset, a target feature and a plurality of candidate features;

determining, for the target feature in relation to each feature of the plurality of candidate features, a first plurality of measures of statistical dispersion;

selecting a first feature and a second feature having lower first measures of statistical dispersion than other features in the plurality of candidate features;

determining, for the target feature in relation to a first combination of the first feature and the second feature, a second measure of statistical dispersion;

in response to determining that the second measure of statistical dispersion does not satisfy a threshold:

selecting a third feature of the plurality of candidate features having a lower measure of statistical dispersion, in relation to the target feature, than the other features after the first feature and the second feature; and determining, for the target feature in relation to a second combination of the first feature, the second feature, and the third feature, a third measure of statistical dispersion; and in response to determining that the third measure of statistical dispersion satisfies the threshold, generating a model using a corresponding plurality of entries and a subset of the plurality of features, wherein the model is trained using the subset of the plurality of features comprising the target feature, the first feature, the second feature, and the third feature.

15. The one or more non-transitory, computer-readable media of claim 14, wherein the instructions further cause the one or more processors to perform operations comprising, in response to determining that the second measure of statistical dispersion satisfies the threshold, generating the model using a different subset of the plurality of features, wherein the model is trained using the different subset of the plurality of features comprising the target feature, the first feature, and the second feature.

16. The one or more non-transitory, computer-readable media of claim 14, wherein determining the target feature comprises:

accessing the training dataset comprising the plurality of features;

determining which feature of the plurality of features is a ground truth for the training dataset, wherein the ground truth is data provided by observation; and assigning the ground truth as the target feature.

17. The one or more non-transitory, computer-readable media of claim 14, wherein the instructions further cause the one or more processors to perform operations comprising:

receiving a test dataset comprising a plurality of test entries and the plurality of features;

dividing the test dataset into a plurality of subsets according to values of the first feature, the second feature, and the third feature; and inputting the plurality of subsets of the test dataset into the model to obtain a plurality of subsets of predictions, wherein each subset of predictions of the plurality of subsets of predictions is associated with a corresponding subset of the test dataset.

18. The one or more non-transitory, computer-readable media of claim 17, wherein the instructions further cause the one or more processors to perform operations comprising:

determining a plurality of residual values for the plurality of subsets of predictions; and in response to determining that a residual value corresponding to a subset of predictions meets a residual threshold:

determining, for the target feature in relation to each feature of the plurality of candidate features for the subset of predictions, a new first plurality of measures of statistical dispersion;

selecting a new first feature and a new second feature having lower measures of statistical dispersion than a set of other features in the plurality of candidate features for the subset of predictions;

determining, for the target feature in relation to a new first combination of the new first feature and the new second feature, a new second measure of statistical dispersion; and in response to determining that the new second measure of statistical dispersion satisfies the threshold, training a new model for the subset of predictions using the plurality of test entries and the target feature, the new first feature, and the new second feature.

19. The one or more non-transitory, computer-readable media of claim 14, wherein the instructions further cause the one or more processors to perform operations comprising:

receiving a test dataset comprising a plurality of test entries and the plurality of features;

dividing the test dataset into a first plurality of subsets according to first values of the first feature and the second feature;

inputting the first plurality of subsets of the test dataset into the model to obtain a first plurality of subsets of predictions, wherein each subset of predictions of the first plurality of subsets of predictions is associated with a corresponding subset of the test dataset;

determining a first plurality of residual values for the first plurality of subsets of predictions;

dividing the test dataset into a second plurality of subsets according to second values of the first feature, the second feature, and the third feature;

inputting the second plurality of subsets of the test dataset into the model to obtain a second plurality of subsets of predictions;

determining a second plurality of residual values for the second plurality of subsets of predictions;

calculating a difference between the first plurality of residual values and the second plurality of residual values; and in response to determining that the difference does not satisfy an improvement threshold, training the model using the plurality of test entries, the target feature, the first feature, and the second feature.

20. The one or more non-transitory, computer-readable media of claim 14, wherein the instructions further cause the one or more processors to perform operations comprising, in response to determining that the second measure of statistical dispersion does not satisfy the threshold:

determining a first information gain associated with the first combination and a second information gain associated with the second combination;

calculating a difference between the first information gain and the second information gain; and in response to determining that the difference does not satisfy an improvement threshold, generating the model using the corresponding plurality of entries and a different subset of the plurality of features, wherein the model is trained using the different subset of the plurality of features comprising the target feature, the first feature, and the second feature.

* * * * *